Sept. 2, 1969     I. KANNETT     3,464,144
ELECTRIC INSECT KILLER
Filed Feb. 7, 1968     2 Sheets-Sheet 1
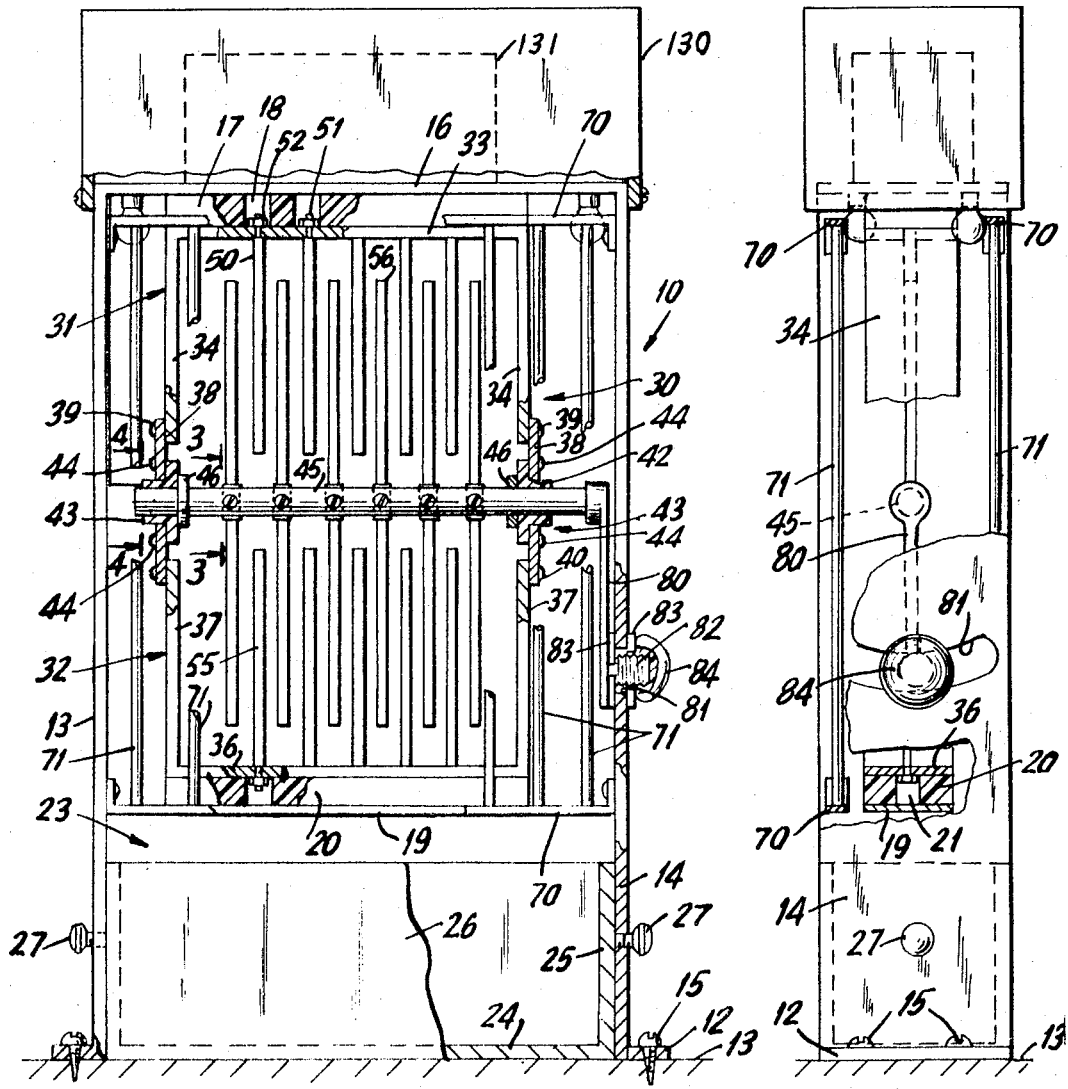
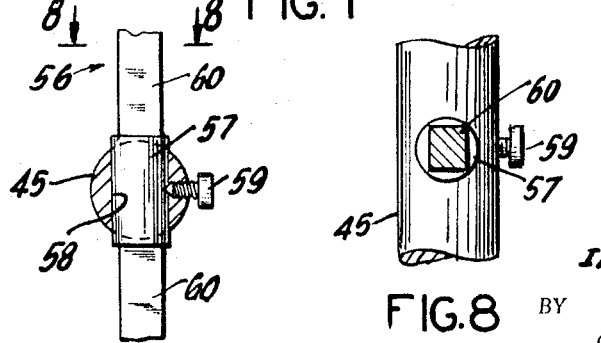
INVENTOR.
IRVING KANNETT
BY J. B. Felshin
ATTORNEY Sept. 2, 1969    I. KANNETT    3,464,144
ELECTRIC INSECT KILLER
Filed Feb. 7, 1968    2 Sheets-Sheet 2
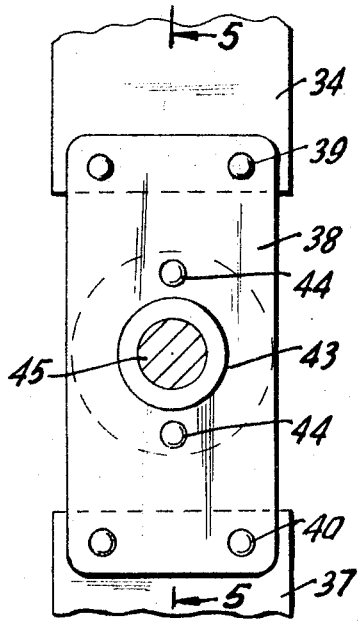
FIG. 4
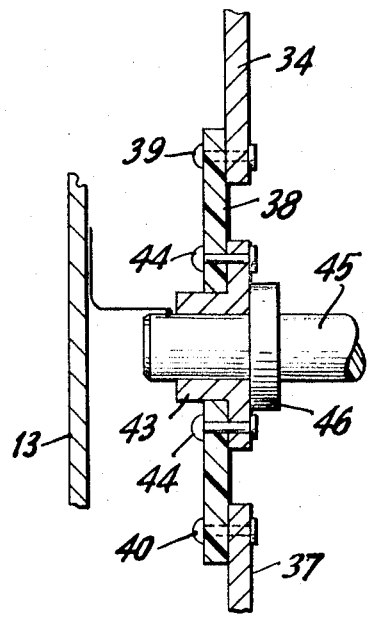
FIG. 5
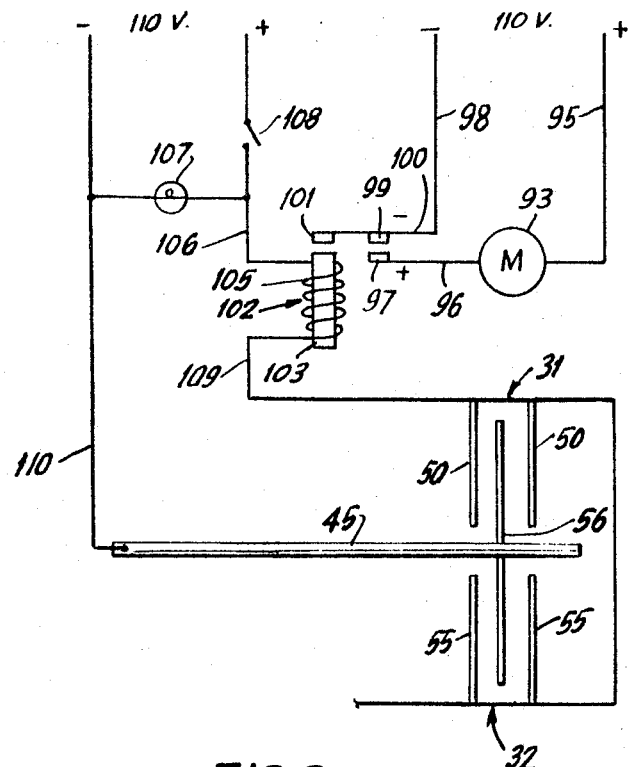
FIG. 6
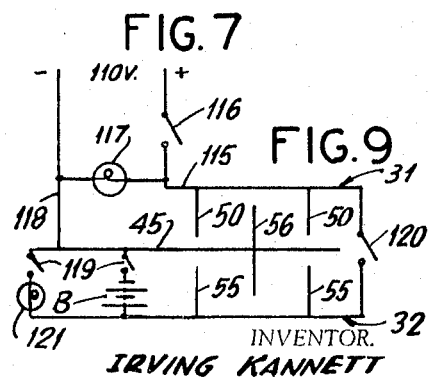
FIG. 7
FIG. 9
INVENTOR.
IRVING KANNETT
BY
J.B. Felshin
ATTORNEY United States Patent Office 3,464,144
Patented Sept. 2, 1969

3,464,144
ELECTRIC INSECT KILLER
Irving Kannett, G.P.O. Box 1651, New York, N.Y. 10021
Filed Feb. 7, 1968, Ser. No. 703,723
Int. Cl. A01m 1/22
U.S. Cl. 43—112                                     15 Claims

ABSTRACT OF THE DISCLOSURE

A stand has fixed thereon a frame having top and bottom conductive grid parts insulated from one another and supporting an oscillatory cross-rod therebetween. The rod carries diametrically opposed radial conductive pins disposed between conductive pins on the grid parts. The shaft can be oscillated manually or by motorized mechanism to clean out electrocuted insects stuck between the pins on the shaft and on the grid parts.

The motor is controlled by magnetic switch means. The stand carries an insulated box at the top for a transformer, fuses and the like electrical parts. Lamps are provided to attract insects and indicate when the electric system is "on." One grid part may be controlled by house current while the other grid part is controlled by a battery. A pan is provided at the bottom of the stand to catch dead insects which drop down from the grids. The pins on the shaft are adjustable by rotation to vary the spaces between the pins on the shaft and the pins on the grid parts.

BACKGROUND OF THE INVENTION

Field of the invention

This invention relates to devices for electrocuting insects which fly into the device and concurrently contact a pin on the shaft and a pin on one of the grid parts.

Description of the prior art

Devices are known in the prior art for electrocuting insects.

SUMMARY OF THE INVENTION

An object of this invention is to provide a device of the character described in which the grid is divided in two parts which may be selectively energized or both can be energized. Also one grid part may be controlled by house current and one grid part may be controlled by battery current.

It has been found in prior devices that when the grid is clogged by dead insects, the device becomes very hot. It is hence another object of this invention to provide means for cleaning out the dead insects to prevent overheating. This is done either manually or by motorized mechanism controlled by a magnetic switch which closes the motor circuit when the device is clogged with dead insects.

A further object of this invention is to provide in a device of the character described, insulated means to contain elements or parts of the electric system, and a removable pan to collect debris created by dead insects.

A still further object of this invention is to provide a strong, rugged and durable device of the character described which shall be relatively inexpensive to manufacture, easy to manipulate, and safe, practical and efficient in use.

Other objects of this invention will in part be obvious and in part hereinafter pointed out.

The invention accordingly consists in the features of construction, combinations of elements, and arrangement of parts which will be exemplified in the construction hereinafter described.

BRIEF DESCRIPTION OF THE DRAWING

In the accompanying drawing, in which are shown various illustrative embodiments of this invention, FIG. 1 is a front elevational view of a device embodying the invention, with parts broken away and in cross-section;

FIG. 2 is a side elevational view of the structure shown in FIG. 1, with parts broken away and in cross-section;

FIG. 3 is an enlarged, cross-sectional view taken on line 3—3 of FIG. 1;

FIG. 4 is an enlarged cross-sectional view taken on line 4—4 of FIG. 1;

FIG. 5 is a cross-sectional view taken on line 5—5 of FIG. 4;

FIG. 6 is a wiring diagram of the electrical system for one form of the invention;

FIG. 7 is a detail of the motorized device for oscillating the shaft which carries grid pins;

FIG. 8 is a cross-sectional view taken on line 8—8 of FIG. 3; and

FIG. 9 is another wiring diagram illustrating use of both house current and battery for energizing the grid parts.

DESCRIPTION OF THE PREFERRED EMBODIMENTS

Referring now in detail to the drawing, 10 designates a device embodying the invention. The same comprises a stand 11 which may be made of metal and comprises a pair of feet 12 contacting a support surface 13. Extending upwardly from the feet 12 are vertical side walls 13 and 14, interconnected by a top cross-member 16. The stand may be attached to the supporting surface by screws 15 passing through the feet 12 and screwed into the support 13. Attached to the underside of the top member 16 in any suitable manner, is a member 17 made of electrical insulating material and formed with a central row of vertical through holes 18. Interconnecting the side walls 13 and 14 is a transverse metal member 19 disposed in spaced relation above the feet 12. Mounted on the transverse member 19 is an insulating plate 20 similar to insulating plate 17, and formed with a central row of vertical holes 21 aligned with the openings 18 in the insulating member 17.

Disposed in the space below the transverse member 19 is a box or container 23 having a bottom wall 24, end walls 25 and side walls 26 and being open at the top. The box 23 may be held in place by thumb screws 27 screwed through threaded openings in side walls 13 and 14. The purpose for the box 23 will be explained hereinafter.

Mounted on and between the insulating members 20, 17 is a grid 30 comprising an upper grid part 31 and a lower grid part 32 in opposed symmetrical relation to one another. The upper grid part 30 comprises a top metal wall 33 which contacts the underside of the insulating member 17 and is affixed thereto in any suitable manner. Extending downwardly from the ends of the wall 33 are side walls 34. The grid part 32 comprises a bottom transverse wall 36 from which extend upwardly, side walls 37 aligned with the side walls 34. Walls 34 and 37 of grid part 31 at each side are interconnected by an insulating plate 38 by means of screws 39 and to walls 37 of grid parts 32 by screws 40. The insulating plates 38 are formed with horizontally aligned, opposed openings 42. Received in each opening 42 is a bearing 43 fixed to said plate by screws 44. Journalled in said bearings 43, for oscillation, is a cross-shaft 45. Fixed to said shaft are collars 46 located at the insides of said bearings 43 to prevent side to side movement of said shaft. Fixed to the upper wall 33 of grid part 31 are downwardly extending grid pins 50.

For this purpose each pin 50 may be formed at its upper end, with a reduced screw threaded portion 51 projecting up through a suitable opening in said wall 33. A nut 52 screwed to the upper end of each threaded portion 51 fixes the pin in place. The pins 50 are aligned with the openings 18 in the insulating member 17. Thus, the upper screw threaded ends 51 of the pins and the nuts 52 are located in the openings 18. The pins 50 are parallel to one another and terminate short of the shaft 45. Fixed to the portion 36 of grid part 32 are pins 55, symmetrical to pins 50 and similarly attached to portion 36. Pins 55 and 50 are aligned with one another. The pins project upwardly but also terminate short of the shaft 45. Sets of pins 50, 56 are coplanar.

Mounted on shaft 45 is a set of grid pins 56. Said pins 56 have central round portions 57 passing through round bores or openings 58 in the shaft 45 (see FIG. 3). Set screws 59 screwed to the shaft 45 serve to keep pins 56 from accidentally rotating or from moving longitudinally. The upper and lower portions 60 of the pins 56 above and below the round portions 57 are rectangular in shape as shown in FIG. 8. Rotating the pins 56, the distance between the pins 56 and the pins 50, 55 may be adjusted. The pins 50 and 55 may also be of similar rectangular shape. It will be noted that the pins 56 are staggered with respect to the pins 50, 55 and are disposed therebetween. Said pins 56 are normally in vertical position.

It will now be understood that if the grid part 31 and the shaft 45 are connected to opposite leads of a source of electric power, if an insert flying between the pins 50, 56 concurrently contacts both of said pins, the insect will be electrocuted.

Means is provided to safeguard the device. To this end there is attached between the side walls 13, 14 of the stand and on opposite sides of the grid, horizontal brackets 70 interconnected by a plurality of vertical bars 71. The bars 71 are so spaced as to prevent a person from putting his hand into the device.

Means is provided to oscillate the shaft 45 so as to clean out the device when it becomes clogged with dead insects. To this end there is fixed to one end of shaft 45, a crank 80. Side wall 14 is formed with an arcuate slot 81. On one end of the carnk 80 is screwed a member 82. Washers 83 may be received on the pin 82 and are disposed on opposite sides of wall 14. Screwed to the screw 82 is a knob or handle 84. By oscillating the knob through an angle allowed by the arcuate slot 81 the shaft 45 and hence the pins 56 are oscillated so that debris and dead insects will drop down into the box 26 through the spaces between the support 19 and the brackets 70. The knob 84 can be tightened at any angle to hold the shaft 45 at that angle.

The current between the grid part 31 and the pins 56 on the shaft may be controlled by house current, whereas the current from the pins on the grid part 32 to the shaft 45 and its pins 56 may be controlled by current from a battery. Also, lamps may be provided for indicating when each part of the grid is receiving current and to attract insects. Also, instead of oscillating the shaft 45 manually it may be oscillated by motorized means. To this end the crank shaft 80 may be connected to a connector 90 to a wheel 91 belted as at 92 (see FIG. 7) to a motor 93. When the motor operates wheel 91 rotates to oscillate the shaft 45.

In FIG. 6, one terminal of motor 93 is connected by wire 95 to one lead of the house current. The other terminal of the motor is connected by wire 96 to a fixed switch contact 97. The other lead of the house current is connected by wire 98 to a second contact 99 adapted to move into engagement with the contact 97. Contact 99 is located on a switch arm 100 carrying a magnetic contact 101. An electromagnet 102 comprises a magnetic core 103 surrounded by a coil 105. When the electromagnet 102 is energized, it will attract the magnetic contact 101 thereby causing downward movement of switch arm 100 to cause contact 99 to engage contact 97 and close the circuit to the motor 93 which then operates the crank 80 for oscillating the shaft 45 for cleaning out collected dead insects.

One terminal of the coil 105 is connected by wire 106 to one lead of the house current. In wire 106 is interposed a manual switch 108. The other terminal of the coil 105 is connected by wire 109 to the grid part 31. As shown in FIG. 6 grid part 31 is permanently connected to the grid part 32. This can be done by making the plates 38 of conductive material. As shown in the wiring diagram shaft 45, which carries the pins 56, is connected by wire 110 to the other lead of the house current. It will now be understood that when the manual switch 108 is closed and an insect straddles a pin 56 and a pin 50 or a pin 56 and pin 55, concurrently, sufficient current will pass through the insect to kill the insect. However, when the spaces between the pins 56 and the pins 50, 55 are clogged with dead insects, sufficient current will pass through the magnetic coil 105 to energize the magnetic core 103 to attract the switch arm 100 and close the switch for the motor 93 to oscillate the shaft 45 and clean out the debris. Lamp 107 is in parallel circuit with wires 106, 110 and in series with switch 108. When switch 108 is "on", lamp 107 will be illuminated to indicate that the current is "on" and to attract insects.

In FIG. 9 there is shown a wiring diagram in which both house current and battery current are used. As shown in FIG. 9, grid part 31 is connected by wire 115 to one lead of the house current. Interposed in wire 115 is a manual switch 116. A lamp 117 is in parallel circuit with the leads to the house current and in series with switch 116. Shaft 45 is connected by wire 118 to the other lead of the house current. Shaft 45 is connected to grid part 32 by a battery B. A manual switch 119 is in series with the battery B. A lamp 121 may also be in parallel with the battery. Switch 119 is a double throw switch. When double throw switch 119 is closed the battery illuminates the lamp 121 and is ready to apply current to the grid 32. A manual switch 120 may be interposed between the grid parts 31 and 32. With this arrangement both grid parts may be operated by house current. In such case the switch 116 is closed, switch 120 is "on" and switch 119 is "off." With this arrangement insects straddling pins 50, 56 or 55 and 56 will be electrocuted by house current. The lamp 117 will be illuminated to indicate that the house current is "on" and to attract insects. If the entire device is to be operated only on house current, battery B and its switch 119 and lamp 121 could be eliminated. Furthermore, instead of using the switch 120, a permanent conductive connection could be established between the grid parts 31 and 32, as by making the plates 38 of conductive material.

To operate entirely on batteries, the wires 115, 118 could be connected to the terminals of a battery instead of to the leads of the house current. In such case the switch 120 could be eliminated and grid parts 31, 32 connected conductively by conductive plates 38 instead of nonconductive plates. The battery B, switch 119 and lamp 121 could then also be eliminated.

Also, grid part 31 may be operated by house current while grid part 32 is operated by battery. In such event switch 119 is closed and switch 120 is opened. In such event the house current will operate the grid part 31 and the battery will operate the grid part 32.

Referring again to the wiring diagram shown in FIG. 6, the grid parts 31, 32 may be connected by a switch 120 as in FIG. 9. The grid part 32 and the shaft 45 may be connected by a battery B, switch 119 and lamp 121 as shown in FIG. 9. In such event both grid parts may operate all on house current or one grid part may be operated on house current and the other on battery as explained for the wiring diagram of FIG. 9. To operate such a hook-up all on house current, switch 120 would be "on" and switch 119 would be "off." To operate grid part 31 on house current and grid part 32 on battery, switch 120 would be "off" and switch 119 would be "on."

An insulated box 130, open at the bottom, is mounted on the upper end of the stand. A transformer 131 placed on top of the stand is housed by said box. The transformer reduces house current to the grids.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawing, is to be interpreted as illustrative and not in a limiting sense.

I claim:

1. In combination, a stand, a pair of grid means on said stand, each comprising a set of grid pins conductively connected, the pins of one set being disposed close to but spaced from the respective pins of the other set, means to mount said sets for relative oscillatory movement on said stand, means to electrically insulate one grid means from the other, and means to pass an electric current through both said grid means when an insect concurrently contacts a pin of each set of pins, and means to cause relative oscillatory movement between said sets of pins to cause one set of pins to move back and forth past and to the opposite sides of the other set of pins.

2. The combination of claim 1, said means to cause relative movement being manually actuable.

3. The combination of claim 1, and electric motor actuated means to control said means to cause relative movement.

4. The combination of claim 3, and switch means to control said electric motor actuated means.

5. The combination of claim 4, said switch means comprising a magnetic switch.

6. The combination of claim 1, said means to mount said sets for relative movement, comprising means to fixedly mount one set on said stand and means to rotatably mount the other set on said stand, the pins of said sets, in one relative position of said sets, being in the plane of the pins of the other set, and the axis of rotation of said other set being in said plane and at right angles to the pins of said other set.

7. The combination of claim 1, and electric means to indicate when the grid means are in condition to receive electric current when an insect interconnects a pin of each set.

8. The combination of claim 1, one of said grid means comprising a shaft to which its set of pins are connected, and means to cause relative movement comprising a crank on said shaft for oscillating said shaft.

9. The combination of claim 8, said stand having an arcuate slot, and handle means on said crank passing through said slot.

10. In combination, a stand, a pair of grid means on said stand, each comprising a set of grid pins conductively connected, the pins of one set being disposed close to but spaced from the respective pins of the other set, means to mount said sets for relative movement on said stand, means to electrically insulate one grid means from the other, and means to pass an electric current through both said grid means when an insect concurrently contacts a pin of each set of pins, one grid means being fixed to said stand and insulated therefrom, the other grid means comprising a shaft rotatably mounted on said first grid means and insulated therefrom, the pins of one set of pins being mounted on said shaft.

11. The combination of claim 10, said pins of said set of pins mounted on said shaft being mounted thereon for angular adjustment relative to the axes thereof.

12. The combination of claim 1, and means to adjust the pins of one set individually to vary the spaces between the pins of one set and the adjacent pins of the other set, when said pins are all in a common plane.

13. In combination, a stand, a pair of grid means on said stand, each comprising a set of grid pins conductively connected, the pins of one set being disposed close to but spaced from the respective pins of the other set, means to mount said sets for relative movement on said stand, means to electrically insulate one grid means from the other, and means to pass an electric current through both said grid means when an insect concurrently contacts a pin of each set of pins, one grid means comprising a second set of pins in the plane of the first mentioned set thereof, disposed symmetrically thereof, said other grid means comprising a set of pins coplanar to its first mentioned set, and disposed symmetrically thereof, and staggered with respect to the pins of said second set of pins of said one grid means, the sets of pins of said one grid means pointing toward each other, and the sets of pins of the other grid means pointing away from each other.

14. The combination of claim 1, and container means removably mounted beneath the stand and movable to opposite sides of the stand to catch dead insects dropping off said grid means.

15. The combination of claim 1, and an insulated container on top of the said stand to house electric elements for said electric current imposing means.

References Cited

UNITED STATES PATENTS

| | | | |
|---|---|---|---|
| 1,012,351 | 12/1911 | Gold | 43—99 |
| 2,448,780 | 9/1948 | Crumrine | 43—99 |
| 2,951,310 | 9/1960 | Anderson et al. | 43—112 |

WARNER H. CAMP, Primary Examiner